United States Patent [19]

Smalley et al.

[11] 4,088,584
[45] May 9, 1978

[54] SECONDARY RECOVERY OF OIL AND POLYMERS USEFUL FOR THIS

[75] Inventors: Graham Smalley, Huddersfield; David A. Frost; Eric Rothwell, both of Bradford, all of England

[73] Assignee: Allied Colloids Limited, Bradford, England

[21] Appl. No.: 529,176

[22] Filed: Dec. 3, 1974

[30] Foreign Application Priority Data

Dec. 4, 1973  United Kingdom ............ 561861/73

[51] Int. Cl.$^2$ ...................... E21B 43/22; C08G 12/06
[52] U.S. Cl. ................................ 252/8.55 D; 166/275; 260/72 R
[58] Field of Search ................ 252/8.55 D; 260/72 R; 166/274, 275

[56] References Cited

U.S. PATENT DOCUMENTS

| 3,039,529 | 6/1962 | McKennon | 252/8.55 X |
| 3,085,063 | 4/1963 | Turbak | 252/8.55 X |
| 3,214,420 | 10/1965 | Hunt et al. | 260/72 X |
| 3,747,676 | 7/1973 | Norton et al. | 252/8.55 X |

Primary Examiner—Herbert B. Guynn
Attorney, Agent, or Firm—Lawrence Rosen; E. Janet Berry

[57] ABSTRACT

Water soluble polymers suitable for use in water flooding during the secondary recovery of oil are described. They are made by a process comprising reacting high molecular weight polyacrylamide with formaldehyde. Processes of water flooding using the polymers are also described.

12 Claims, No Drawings

SECONDARY RECOVERY OF OIL AND POLYMERS USEFUL FOR THIS

The recovery of reservoir oil from an oil well is normally conducted in two stages. The primary process comprises conventional production and recovery techniques, but this only yields a small proportion of the available oil, the bulk being left underground. For instance the primary stage operating under autogenous pressure commonly yields only 10 to 20%, of the available oil.

To recover further quantities of the residual oil water flooding may be used for the secondary recovery of oil, i.e. as the secondary process. Water is pumped under pressure down injection wells to force the oil through the strata to the production well. However, when the mobility of the water is greater than that of the oil "viscous fingering" occurs giving premature breakthrough of the water. The process thus becomes uneconomical to continue and this results in the loss of a high proportion of the available oil in the less permeable zones of the reservoir which the water flood has not penetrated.

Various water soluble polymers have been used which when dissolved in the water reduce the mobility of the aqueous phase. As a result, during the water flooding process the aqueous phase maintains a more regular solvent front giving greater sweep efficiency and consequently the recovery of a larger proportion of the available oil is possible before breakthrough occurs. This process is referred to as "polymer flooding".

The requirements of a polymer capable of giving successful polymer flood are numerous. For example, the polymer must control the mobility of the aqueous phase over a wide range of conditions of mechanical shear, pH, temperature and brine concentratins. The polymer must not degrade under the conditions of the process, which may take a long time to complete. It is particularly important that adsorption of the polymer onto the strata must be minimal since excessive adsorption would lead to several problems. First, it would be wasteful. Second, it would reduce the permeability of the strata causing partial or complete plugging. Third, to compensate for losses by adsorption higher concentrations of the polymer than are actually required for mobility control would have to be injected, and therefore initially the polymer solution may be at a mugh higher viscosity than is required for the flooding process. Excessive pressures are consequently required for injection, and the risk of fracturing the oil-bearing strata is thereby considerably increased. When fracturing occurs oil recovery is hindered because the injected fluid is lost through the fissures which have been formed and therefore the oil cannot be swept through the strata. Additionally the polymer must exhibit very good solubility in water since insoluble material would tend to plug the strata and so has to be removed by difficult and tedious filtration techniques.

The difficulty is to find a polymer with the necessary characteristics which can function satisfactorily at an economical dosage level.

Certain copolymers of acrylamide, including both hydrolysed and non-hydrolysed polyacrylamides, have been found of interest for this purpose. Thus U.S. Pat. Nos. 2,827,964 and 3,039,529 describe the use of high molecular weight partially hydrolysed polyacrylamides. Such polymers are anionic in character because of the presence of carboxyl groups. We find that carboxylated polyacrylamides generally are capable of giving solutions of suitably high viscosity in pure water at low and hence more economical concentrations than unhydrolysed polymers. However because of their ionic nature such polymers are sensitive to the action of water soluble salts which are usually present through the use of connate water. Thus when carboxylated polyacrylamides are dissolved in water they expand due to the mutual repulsion of the ionic groups along the polymer chain and give rise to very high viscosity solutions. In brine solutions, however, dissolved ions oppose this charge effect causing substantial contraction of the polymer molecules resulting in a large drop in the viscosity of the solution. If one attempts to provide a sufficiently high viscosity under these conditions by the use of ultra high molecular weight polymers obtained by high degrees of polymerisation in conventional manner, difficulty arises due to the tendency of such products to exhibit poor solubility characteristics due to the presence of insoluble polymer in appreciable quantity.

On the other hand non-hydrolysed polyacrylamides, as described in U.S. Pat. No. 3,020,953, impart much lower viscosities to water than the carboxylated species at the same molecular weight and concentration and the problem described above if one attempts to make conventional soluble ultra high molecular weight product persists here also.

A number of simple additives have been described which when used in conjunction with water soluble polymers of a wide range of compositions afford a system of greater stability but not greater effect. Thus U.S. Pat. No. 2,827,964 describes the use of aldehydes as bactericides in polyacrylamide. U.S. Pat. Nos. 3,042,611, 3,053,765 and 3,085,063 describe the use of formaldehyde as bactericide and viscosity stabiliers in dextran and other polymers. According to U.S. Pat. No. 3,747,676, abandoned U.S. application Ser. No. 117,692 described the use of formaldehyde as oxygen scavenger and for improving the screen factor of polyacrylamide in polymer flooding.

Reaction products of formaldehyde with polyacrylamide have also been described. Thus U.S. Pat. No. 3,638,729 describes the use of a combination of a solution of hydrolysed polyacrylamides and gel particles of partially hydrolysed polyacrylamides gelled with formaldehyde. We find however that the presence of gelled material can cause partial or even complete plugging of the oil bearing strata with consequent breakdown of the polymer flood.

U.S. Pat. No. 3,747,676 describes the methylolation of polyacrylamide by reaction with formaldehyde for improving the viscosity, screen factor and oil recovery characteristics. The reaction time described as being optimum is 1 to 10 hours and the maximum duration exemplified is 5 hours, the temperature being 50° C. The pH range quoted for the reaction is 7.5 to about 11 with a range of 10 to 10.5 being preferred. Although some improvement in, for example, viscosity and therefore in water flooding may be obtainable by this process the products still leave something to be desired. Also the products of U.S. Pat. Nos. 3,638,729 and 3,747,676 both have a tendency to be adsorbed onto the strata with consequent loss of mobility control.

U.S. Pat. No. 3,760,879 describes how a polymer for use in water flooding can be made by reacting polyacrylamide with formaldehyde at a pH of from 7 to 11 and then reacting the product with an inorganic sulphite at a pH of 9 to 14, preferably 10 to 13. A reaction scheme is given showing that in the first stage a copolymer of acrylamide and methylolacrylamide is formed and in the second stage a copolymer is formed of acrylamide, methylolacrylamide, acrylic acid salt, and sulphomethylated acrylamide. Prior art reviewed in the specification also describes that sulphomethylation of polyacrylamide occurs with formaldehyde and sodium bisulphite at pH levels of 10 to 12.

It has been our object to produce polymers that give improved results when used in water flooding during the secondary recovery of oil.

We find surprisingly that it is possible to produce new polymers having improved properties in this respect if one reacts formaldehyde with high molecular weight polyacrylamide in an aqueous medium in which the polyacrylamide and the final polymer are dissolved and which preferably contains less than 3% of the polyacrylamide and has a pH above 11.0, if the reaction medium is substantially free of sulphite. The reaction has to be continued for a sufficiently long period for a water soluble polymer having the desired properties to be formed. At most convenient temperatures, for example at temperatures from room temperature to, say, 50° C, the reaction should be continued for at least 5 or 10, preferably at least 20 hours and preferably from 48 to 150 hours. Such a duration is especially preferred when the temperature is in the preferred range of 35° to 50° C. However, at higher temperatures it may be possible to operate satisfactorily with shorter reaction times. It is generally desirable that the reaction should not be continued for too long as otherwise there is a tendency for the polymer to lose some solubility. Generally at temperatures up to 50° C the reaction should not be continued for longer than 150 hours.

Although we cannot be absolutely certain at present, it does seem that the duration of the reaction must be such that it continues until cross-links in the polyacrylamide are formed. However, it seems that the presence of sulphite in substantial amounts in the processes described in U.S. Pat. No. 3,760,879 prevents cross-linking occurring to a significant extent, while cross-linking does not occur, even in the absence of sulphite, at pH values below 11. Thus in the process of U.S. Pat. No. 3,747,676 and in the first stage of the process of U.S. Pat. No. 3,760,879, cross-linking does not occur because the pH is too low, while in the second stage of the process of U.S. Pat. No. 3,760,879 cross-linking does not occur partly at least because sulphomethylation occurs instead.

The cross-linking probably have the structure — CONHCH$_2$NHCO— and are usually present in a small amount only. Thus the cross-links or other characteristic groups obtained in the invention must be present in an amount sufficient to give the desired properties but insufficient to render the polymer water insoluble. Generally the number is at least 0.0001% (based on the moles of recurring monomer units in the polymer) and preferably at least 0.0001% while often it is below 1%. It will be below the critical value of the cross-linking index. The characteristic properties of the polymers of the invention that make them so useful are that they give surprisingly high viscosities in very dilute solutions in water and, in particular, they maintain very satisfactory viscosities when in solution in brine or other salt solutions.

The polyacrylamides that are reacted in the invention must have a high molecular weight and thus preferably have a viscosity average molecular weight above $5 \times 10^6$, and most preferably above $8 \times 10^6$. As a result the final polymers claimed in the invention will also have molecular weights at least as high as these figures.

Although we are not absolutely certain at present as to the structure of the polymers, it does seem that we have formed new polymers that have a viscosity average molecular weight greater than $5 \times 10^6$ and which comprise recurring acrylamide groups and which are cross-linked by groups of the formula —CONHCH$_2$NHCO—.

The pH of the reaction necessary for forming the polymers must be above 11, usually 11 to 13, and most preferably 11.5 to 12.5. The concentration of the acrylamide polymer in the initial solution is preferably low and is normally below 3%. Usually it will be at least 0.5% and most preferably it is from 0.8 to 2%. The formaldehyde is preferably present in a concentration of 0.1 to 2.0, and most preferably 0.3 to 1.8, moles per mole of acrylamide monomer contained in the polyacrylamide.

A preferred process according to the invention comprises forming a solution of 0.5 to 3% by weight of a polyacrylamide homopolymer or copolymer with acrylic acid having a viscosity average molecular weight greater than $5 \times 10^6$, adjusting this solution to a pH of 11.5 to 12.5, and reacting the polymer in the solution with from 0.3 to 1.8 moles formaldehyde per mole amide for from 48 to 150 hours at a temperature of 35° to 50° C.

In the invention formaldehyde may be used as such, or a compound that liberates formaldehyde for the reaction, e.g. hexamethylene tetramine, may be used.

The reaction is preferably carried out in salt free solutions, and subsequently the reaction solution should be diluted to normal working concentrations with either pure water or brine when the reaction is to be terminated.

We set out below two possible reaction sequences.

When formaldehyde is selected as the cross-linking agent the chain-branching reaction may proceed through a methylated intermediate stage e.g., reaction sequences 1 or 2, but we do not wish to be limited to either of these reaction sequences.

Reaction Sequence 1.

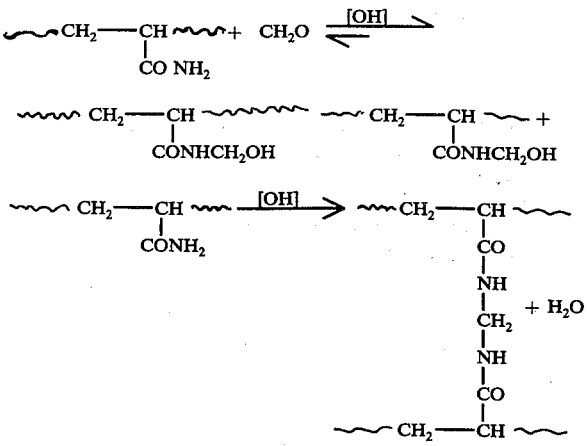

Reaction Sequence 2.

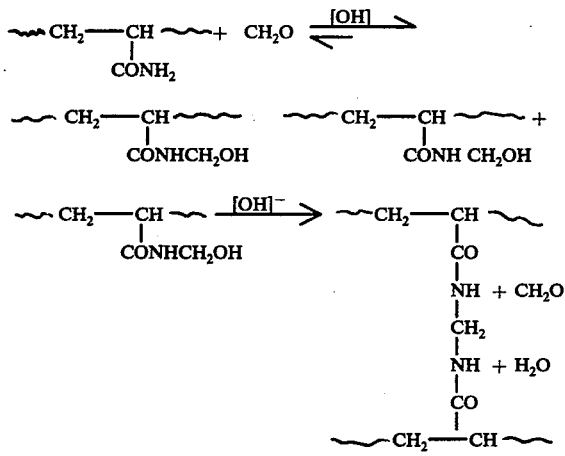

Unlike products such as those described in U.S. Pat. No. 3,760,879, the presence of residual methylol groups in the new polymers is incidental, and it is not essential for providing a polymer having the desired characteristics, and indeed frequently the final polymer contains no methylol groups. However, if they are present they may be present in any convenient amount up to, for example, 30%.

The reaction conditions may result in hydrolysis of acrylamide groups such that, for instance, acrylic acid groups are formed. Thus, for example, 30 to 40 mole % of the amide groups may be hydrolysed to carboxylate groups. The presence of these groups is beneficial to the performance of the polymer, as the partially hydrolysed products exhibit a significantly reduced tendency to be absorbed onto the strata. In general, however, the products should contain at least 50 mole % acrylamide groups. In addition to forming groups other than acrylamide groups during the reaction, one can obtain desirable results by using a copolymer of acrylamide in the reaction instead of a homopolymer. For example it can be desirable to use in the reaction a copolymer of acrylamide together with a water soluble comonomer such as an acrylic and/or methacrylic acid salt, or trimethylmethacryloxyethyl-ammoniumchloride. Further a copolymer may be used in which a comonomer is water insoluble provided it is not present in sufficient proportion to render the polymer insoluble or to effect in a deleterious manner the solution viscosity characteristics of the polymer.

The polymers of the invention may be used in the water flood process in any convenient manner and various methods can be used. For example the concentration may be varied during the flooding process, or the flooding solution may be preceeded or followed by an alternative flooding agent. A combination of the products of the invention with another flooding polymer such as a linear anionic polysaccharide may be used for simultaneous injection. Other additives may also be used for preventing undesirable side effects normally encountered. For example alkali hydrosulphite may be added to prevent precipitation of ferric hydroxide, as in U.S. Pat. No. 3,343,601, which would cause plugging of the strata. Sequestering agents such as ethylenediamine tetraacetic acid may also be incorporated.

They are dissolved in the brine of pure water for the flood at any convenient concentration, which will usually be within the range 10-10,000 ppm, preferably 50-1,000 ppm and most preferably 50-500 ppm, especially 100-300 ppm. These ranges are especially applicable for brine, since even lower concentrations can be used in salt-free water.

We find that the product of the invention has the desired effect on the mobility of the aqueous system at dosage levels which are very significantly lower than the unmodified polymer and is able to provide a more economical polymer flood. Additionally the reaction conditions are sufficiently simple that the reaction can be carried out at the injection site.

A further incidental benefit of the products of the invention is their favourable viscosity shear characteristics. A Newtonian fluid on passing through a strata with varying permeabilities would penetrate the more permeable zones at the expense of the less permeable zones. This would result in viscous fingering which causes premature breakthrough. However, on passing the products of the invention through such a strata at the normal frontal velocity of approximately 1 to 10 feet per day, the increased shearing effect in the less permeable zones causes a reduction in the apparent viscosity allowing these zones also to be effectively swept and providing the required planar polymer flood front.

A main advantage of the products of the invention however is that they are effective at much lower concentrations than are the products that are at present considered commercially satisfactory and than the products described in, for example, U.S. Pat. No. 3,747,676. For instance, reference to Example 7 below shows that the exemplified products of the invention can be used at about half the concentration of the present commercially acceptable product Dow Pusher 700. This represents an enormous improvement in activity and a great saving in the amount of polymer required.

The following are some Examples. Examples 1 and 2 show the production of polymers in accordance with the invention while Example 3 shows the production of a polymer according to U.S. Pat. No. 3,747,676. Examples 4 to 7 show tests on the properties of these various polymers.

EXAMPLE 1

A 1% solution of polyacrylamide (mol wt. $1 \times 10^7$) was treated with 0.5 moles formaldehyde per amide unit, and adjusted to pH 12.1 by addition of 10% sodium hydroxide solution. The reaction mixture was maintained at 40° C for 95 hours, and then neutralised to pH 7.5 with hydrochloric acid. The product contained no residual methylolacrylamide groups.

EXAMPLE 2

The procedure of Example 1 was follows but using 1.5 moles formaldehyde per amide unit at a pH of 12.3, giving a product containing 24% of the original amide units as methylolacrylamide groups.

EXAMPLE 3

A 1% solution of the same polyacrylamide as in Example 1 was reacted with 1.5 moles formaldehyde per amide unit at a pH of 10.0, a temperature of about 50° C and for a duration of about 5 hours. The product contained 67% of the original amide units as methylolacrylamide groups. This is product typical of the prior art according to U.S. Pat. No. 3,747,676.

EXAMPLE 4

The products from examples 1, 2 and 3 were diluted to a concentration equivalent to 0.2% of the original polyacrylamide in deionised water and the viscosity of these dilutions was compared with that of 0.2% solutions of the original polyacrylamide and of Dow Pusher 700 which is a typical hydrolysed polyacrylamide used for mobility control in polymer flooding. The viscosities of these solutions were measured on a Brookfield RVT viscometer using No. 1 spindle over a range of speeds.

Table 1

| | Viscosity (cps) of 0.2% solutions in deionised water | | | | |
|---|---|---|---|---|---|
| RPM | Original Poly-acrylamide | Product of Example 1 | Product of Example 2 | Product of Example 3 | Dow Pusher 700 |
| 1 | 20 | 6500 | 4700 | 25 | 2100 |
| 2.5 | 16 | 3500 | 2800 | 19 | 1200 |
| 5 | 15.5 | 2200 | 1900 | 18 | 770 |
| 10 | 18 | 1400 | 1400 | 18 | 500 |
| 20 | 20 | 840 | 900 | 20 | 350 |
| 50 | 22.5 | 550 | 600 | 23 | 280 |
| 100 | 28 | 350 | 400 | 25 | 210 |

Thus, products of the invention, Examples 1 and 2, give considerably greater viscosities than a conventional waterflooding polymer, P700, or product prepared according to U.S. Pat. No. 3,747,676 which showed virtually no improvement over the original polyacrylamide. The product containing residual methylol groups, Example 2, shows no advantage over product containing no residual methylol groups, Example 1.

EXAMPLE 5

The test procedure used in Example 4 was followed except that the 0.2% polymer solutions were prepared in brine containing 0.37% sodium chloride and 0.03% calcium chloride. This brine is typical of the salt content of connate water used for flooding processes.

Table 2

| | Viscosity (cps) of 0.2% solutions in brine | | | | |
|---|---|---|---|---|---|
| RPM | Original Poly-acrylamide | Product of Example 1 | Product of Example 2 | Product of Example 3 | Dow Pusher 700 |
| 1 | 20 | 240 | 250 | 22 | 90 |
| 2.5 | 16 | 200 | 170 | 18 | 80 |
| 5 | 16 | 170 | 150 | 16 | 72 |
| 10 | 16.5 | 140 | 120 | 16 | 63 |
| 20 | 20 | 110 | 97 | 18 | 53 |
| 50 | 22 | 80 | 80 | 23 | 47 |
| 100 | 27.5 | 69 | 77 | 25 | 48 |

Thus, products of the invention give considerably greater viscosities than a conventional waterflooding polymer, a product prepared according to U.S. Pat. No. 3,747,676, or the untreated polyacrylamide when dissolved in brine at the same concentration. Again the presence of residual methylol groups is seen to be unnecessary to provide the desired effect.

EXAMPLE 6

Product prepared as in Example 1 was diluted to 0.2% concentration in brine containing 0.37% sodium chloride and 0.03% calcium chloride, and the solution was stored at 40° C. The viscosity of the solution was determined after 12 weeks storage using a Brookfield RVT viscometer. A solution of Dow Pusher 700 was similarly prepared and stored under identical conditions.

Table 3

| | Viscosity of dilutions in brine on storage at 40° C (cps) | | | |
|---|---|---|---|---|
| | Product of Example 1 | | Dow Pusher 700 | |
| RPM | Fresh Soln. | Soln. at 12 weeks | Fresh Soln. | Soln. at 12 weeks |
| 1 | 240 | 172 | 85 | 20 |
| 2.5 | 184 | 145 | 80 | 16 |
| 5 | 146 | 130 | 72 | 18 |
| 10 | 118 | 110 | 62 | 18 |
| 20 | 98 | 90 | 53 | 18 |
| 50 | 96 | 78 | 48 | 20 |
| 100 | 100 | 72 | 48 | 30 |

Thus it is seen that the solutions of product prepared in Example 1 show a good level of stability on storage at 40° C, and show a distinct advantage in this respect over P.700, a product of the prior art.

EXAMPLE 7

Mobility control determination were carried out on these products using Berea Sandstone cores of 1 inch diameter and 2 inches length, and permeability of 500 millidarcies. The cores were first flooded with 800 ml. brine solution containing 0.37% sodium chloride and 0.03% calcium chloride under a pressure differential of 1 atm. The brine was then displaced by 100 pore volumes of polymer solutions prepared in brine, and the flow rates monitored, again at 1 atm. pressure differential.

The mobility reduction factor (MRF) of the polymer solution was thus obtained, higher factors indicating greater mobility control $$\text{Thus, MRF} = \frac{\text{mobility of brine prior to polymer flood}}{\text{mobility of polymer solution}}$$

$$= \frac{\text{flow rate of brine prior to polymer flood}}{\text{flow rate of polymer solution}}$$

Table 4

| Mobility reduction factors for polymer solutions in brine after the passage of 100 pore volumes | | |
|---|---|---|
| Polymer | Concentration ppm | MRF |
| Dow Pusher 700 | 500 | 27.2 |
| Polyacrylamide as used in Examples 1, 2 and 3 | 500 | 15 |
| Product of Example 1 | 300 | 35.5 |
| Product of Example 1 | 150 | 24.5 |
| Product of Example 3 | 500 | 20 |

Thus product of the invention Example 1 is shown to exhibit greater mobility control than the original polyacrylamide, the established commercial product and the product of U.S Pat. No. 3,747,676 at significantly reduced dosage levels, thus providing a much more economical polymer flood.

EXAMPLE 8

Berea sandstone cores 1 inch diameter 5 inches length were heated at 450° for 3 hours to consolidate them and mounted to allow the passage of fluid along the length of the core under a pressure drop of 20 psi. The core was flooded with 5 pore volumes of Shell Tellus oil and the oil displaced by the aqueous flooding medium. The volume of oil recovered when water first appeared at the core outlet (breakthrough volume) and the total oil recovered were recorded and the results are shown in Table 5.

In one experiment Amocobrine (3700 ppm NaCl, 300 ppm CaCl$_2$) was used as the flooding medium while in others 250 ppm of the additives listed in Table 5 were added.

| Pore Volumes (PV) of Oil Recovered in the Displacement Tests | | |
|---|---|---|
| Additive to Amocobrine | Breakthrough Volume (% PV) | Total Oil Recovered (% PV) |
| None | 22 | 51 |
| Dow/Pusher 700 | 51 | 73 |
| PAM | 45 | 62 |
| B1 | 66 | 88 |

PAM refers to polyacrylamide having a 1% SLV of 324 cs. Bl was prepared from the above mentioned PAM by the procedure described in Example 1. The high figures given for Bl demonstrate its superiority in the water flood process for the recovery of oil.

We claim:

1. A water flooding process for the secondary recovery of oil from a production well comprising injecting water under pressure to force oil to the production well, and in which the mobility of the water is reduced by including in the water a water soluble polymer, containg from 0 to 30 mole % methylol groups, made by reacting 0.1 to 2 moles formaldehyde with 1 mole polyacrylamide homopolymer or copolymer having a viscosity average molecular weight above 5 × 10$^6$ in an aqueous medium having a pH of above 11 but not more than 13 and that is substantially free of sulphite and that contains from 0.5 to 3% of the said homopolymer or copolymer and continuing with the reaction until crosslinks in the polyacrylamide are formed.

2. The process of claim 1 wherein the pH is above 11.5 and wherein the aqueous medium contains more than about 0.8% of the said homopolymer or copolymer.

3. The process of claim 1 wherein the reaction is carried out for about 5 to 150 hours at a temperature of from about room temperature to 50° C.

4. The process of claim 1 wherein the polymer contains more than 50 mole % acrylamide groups and also contains acrylic acid salt groups.

5. The process of claim 1 wherein the polymer contains more than 50 mole % acrylamide groups and from 30 to 40 mole % acrylic acid salt groups.

6. The process of claim 1 wherein the pH is from 11.5 to 12.5.

7. The process of claim 1 wherein the reaction is conducted for at least 20 hours.

8. The process of claim 1 wherein the reaction is conducted for from 48 to 150 hours at a temperature of from 35° to 50° C.

9. The process of claim 1 wherein the concentration of polyacrylamide in the reaction medium is from 0.8 to 2% by weight.

10. The process of claim 1 wherein the reaction medium contains from 0.3 to 1.8 moles formaldehyde per mole acrylamide monomer in the polyacrylamide.

11. The process of claim 1 wherein the polyacrylamide has a viscosity average molecular weight above 8 × 10$^6$.

12. A water flooding to reduce the mobility of the water methylol groups, prepared by forming a solution of 0.5 to 3% by weight of a polyacrylamide homopolymer or copolymer with acrylic acid having a viscosity average molecular weight greater than 5 × 10$^6$, said solution being substantially free of sulphite, adjusting this solution to a pH of 11.5 to 12.5, and reacting the polymer in this solution with from 0.3 to 1.8 moles formaldehyde per mole amide for from 48 to 150 hours at a temperature of from 35° to 50° C.

* * * * *